United States Patent
Matsuoka et al.

(10) Patent No.: US 6,911,795 B2
(45) Date of Patent: Jun. 28, 2005

(54) ELECTRIC MOTOR APPARATUS AND POWER STEERING SYSTEM

(75) Inventors: Yuichiro Matsuoka, Okazaki (JP); Yoshiyuki Shibata, Toyota (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/726,697

(22) Filed: Dec. 4, 2003

(65) Prior Publication Data

US 2004/0113575 A1 Jun. 17, 2004

(30) Foreign Application Priority Data

Dec. 16, 2002 (JP) ........................................ 2002-363896

(51) Int. Cl.$^7$ .............................................. H02K 23/16
(52) U.S. Cl. ......................... 318/437; 318/727; 318/254
(58) Field of Search .............................. 310/68 R, 256; 378/437; 180/444; 318/254, 727, 138, 439, 72.4, 244

(56) References Cited

U.S. PATENT DOCUMENTS

| 4,412,794 A | * | 11/1983 | Presley ....................... 418/61.1 |
|---|---|---|---|
| 4,434,389 A | | 2/1984 | Langley et al. |
| 4,825,972 A | * | 5/1989 | Shimizu ....................... 180/444 |
| 5,242,325 A | * | 9/1993 | Nukushina ................... 454/285 |
| 6,483,212 B1 | * | 11/2002 | Mimura et al. ........... 310/68 R |
| 2003/0184183 A1 | * | 10/2003 | Sakai et al. ................. 310/254 |

FOREIGN PATENT DOCUMENTS

DE     100 39 170     6/2001

* cited by examiner

*Primary Examiner*—Karen Masih
(74) *Attorney, Agent, or Firm*—Oblon, Spivak, McClelland, Maier & Neustadt, P.C.

(57) ABSTRACT

In an electric motor apparatus of the present invention, both of energized spiral wires 17A and 17B for a first system 18A and a second system 18B cooperate to rotate the rotor 25 in a normal condition, however, when it is happened an abnormal condition in one of the first system and the second system, the energized spiral wires of the other system rotate the rotor 25 so that the present invention can prevent the rotation of the electric motor 14 from stopping just after the abnormal condition in either of the systems to achieve a fail-safe function. Therefore, the present invention can decrease a number of parts in comparison with the conventional apparatus having two actuators to restrain an increase of the cost and to achieve a compact structure.

12 Claims, 4 Drawing Sheets

ELECTRIC MOTOR APPARATUS AND POWER STEERING SYSTEM

INCORPORATION BY REFERENCE

The present application claims priority under 35 U.S.C. §119 to Japanese Patent Application No. 2002-363896, filed on Dec. 16, 2002. The content of that application is incorporated herein by reference in their entirety.

BACKGROUND OF THE INVENTION

1. Field of the Invention

The present invention relates to an electric motor apparatus driving an electric motor by a driving circuit and a power steering system controlling a steered angle of a steered wheel separated mechanically from a steering angle of a steering wheel in a vehicle by the electric motor apparatus on a basis of a steering angle of a steering wheel.

2. Description of the Related Art

It is recently developed a power steering system, so called steer by wire system controlling a position of a steered angle of a steered wheel separated mechanically from a steering angle of a steering wheel in a vehicle by means of an actuator such as an electric motor on a basis of a steering angle of a steering wheel. It is typically known for this kind of the power steering system providing two actuators for a fail-safe function at an abnormal condition of the actuators as disclosed in for example Japanese Patent Laid-open Publication No. 2002-37112.

In the above-mentioned related art of the power steering system, since there are two actuators, a total cost is increased and a total size of all of an electric motor apparatus and the steering system become large.

SUMMARY OF THE INVENTION

In view of the previously mentioned circumstances, it is an object of the present invention to provide an electric motor apparatus and a power steering system being able to reduce a total cost and to make them compact.

It is second object of the present invention to provide an electric motor apparatus detecting a position of a rotor to reduce a number of parts and cost thereof.

It is third object of the present invention to provide an electric motor apparatus preventing the electric motor from stopping immediately after the abnormal condition of position sensors.

It is fourth object of the present invention to provide an electric motor apparatus reducing a torque ripple of the electric motor and to drive it smoothly.

It is fifth object of the present invention to provide a power steering system achieving a fail-safe function with a low cost.

In order to achieve the above and other objects, the present invention provides an electric motor apparatus having mainly two groups of spiral wires for first and second systems rotating a rotor of an electric motor, wherein where one of said spiral wires is in abnormal condition, a controller controls a driving circuits for the electric motor to rotate the rotor by the other remaining spiral wires only. In the present invention, at least one of two groups of energized spiral wires rotates the rotor in a normal condition or both groups of spiral wires cooperates to rotate the rotor in a normal condition, however, when it is happened the abnormal condition in one of the first system and the second system, the energized spiral wires of the other system rotates the rotor so that the present invention can prevent the rotation of the electric motor from stopping just after the abnormal condition in either of the systems to achieve a fail-safe function by only one actuator of the electric motor. Therefore, the present invention can decrease a number of parts in comparison with the conventional apparatus having two actuators so that it restrains an increase of the cost and to achieve a compact structure. More over, since the present invention share one stator by two groups of spiral wires for the first and second systems, the present invention can reduce a longitudinal length of the electric motor apparatus and the total cost in comparison with two stators positioned longitudinally in series of two systems.

Second aspect of the present invention is that the electric motor is an alternating current motor changing a phase of a current supplied to two groups of spiral wires of the first and second systems according to a position of the rotor, and one position sensor detects the position of the rotor and is shared by the first and second systems. Therefore, in the second aspect of the present invention, only one position sensor detecting positions of the rotor of the electric motor is prepared for being shared by the first and the second systems so that the present invention can reduce a number of parts thereof and restrain the total cost thereof in comparison with each two position sensors for each system.

Third aspect of the present invention is that the electric motor is an alternating current motor changing a phase of a current supplied to said two groups of spiral wires of the first and second systems according to a position of the rotor, the electric motor apparatus provides two position sensors for each of first and second systems, and where one of the position sensors is in the abnormal condition, the controller energizes one of or both of first and second systems. Therefore, it prevents the electric motor from stopping immediately after the abnormal condition of the position sensors.

Fourth aspect of the present invention is that each of plural spiral wires for the first and second systems are disposed one by the other alternatively, and the controller controls each of first driving circuit for the first system and second driving circuit for the second system to shift the current phase of spiral wires on neighboring teeth in the first and second systems at an angle corresponding to an angle distance of the neighboring teeth. Therefore, the present invention can cancel deviations of position phase of the spiral wires to reduce a torque ripple and to drive the electric motor smoothly.

Fifth aspect of the present invention is that a steering wheel and a steered wheel for a vehicle are separated mechanically, and the electric motor apparatus controls to position a steered angle of the steered wheel on a basis of a steering angle of the steering wheel. Therefore, the power steering system of the present invention can achieves the fail-safe function and it can reduce the total cost and also make the power steering system compact.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
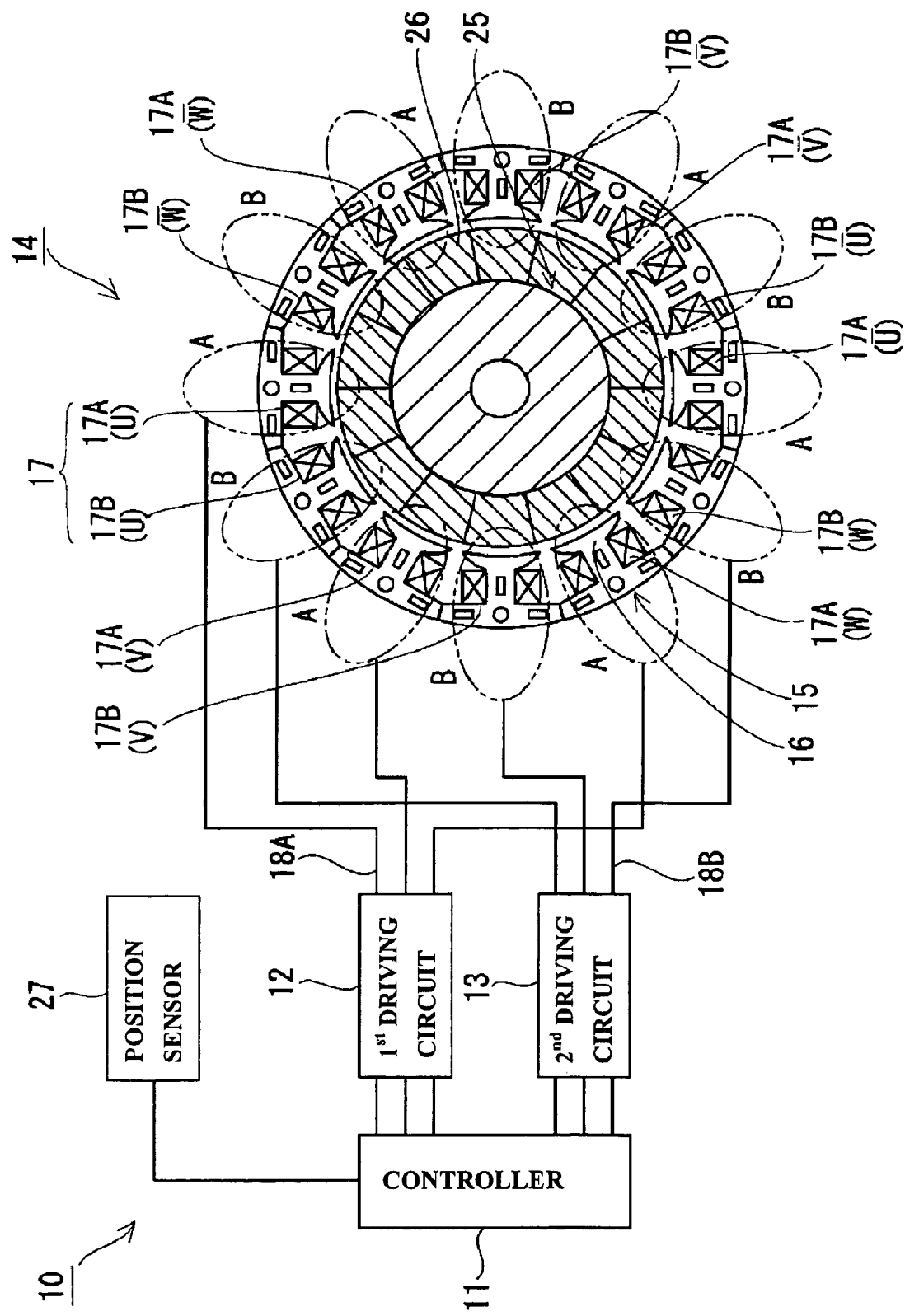
FIG. 1 is a cross-sectional view of the electric motor apparatus of a first embodiment of the present invention.

A preferred embodiment of first example of an electric motor apparatus according to the present invention will be described referring to FIG. 1. FIG. 1 shows the electric motor apparatus 10 according to the first embodiment of the present invention, and the electric motor apparatus 10 drives an electric motor 14 by a first driving circuit 12 and a second driving circuit 13 on a basis of an output signal from a controller 11. The electric motor 14 is a three phase AC brushless motor and comprises a stator core 15 and a rotor 25. In an inner surface of the stator core 15 are equipped plural teeth 16 in a peripheral direction. Each of plural spiral wires 17 is wound a column portion of each of teeth 16. These plural spiral wires 17 are classified into two groups of plural spiral wires 17A energized by the first driving circuit 12 and plural spiral wires 17B energized by the second driving circuit 13. In detail, these teeth 16 comprise twelve teeth, therefore, these plural spiral wires 17 are twelve wires. Six spiral wires 17A are alternately installed and connected to the first driving circuit 12 to consist of a first system 18A. Remaining six spiral wires 17B are alternately installed and connected to the second driving circuit 13 to consist of a second system 18B. Therefore, each group of the plural spiral wires 17A and 17B are positioned one by the other alternately in the peripheral direction.

The first driving circuit 12 is a three phase bridge circuit having a switching element of a MOSFET etc. The MOSFET is energized to ON/OFF stages by the control signal from the controller 11 to flow three phase alternating current in the first system 18A. In a cross-sectional view of the electric motor 14 of FIG. 1, electric current is flown with a U phase, a V phase, a W phase, a U bar ($\overline{U}$) phase, a V bar ($\overline{V}$) phase, a W bar ($\overline{W}$) phase in an order counterclockwise from one spiral wire 17A (U) located at center and upper position. The second driving circuit 13 is a three phase bridge circuit same to the first driving circuit 12 to flow three phase alternating current in the second system circuit 18B. In FIG. 1, electric current is flown with a U phase, a V phase, a W phase, a U bar phase, a V bar phase, a W bar phase in an order counterclockwise from the other spiral wire 17B (U) located at next left position from the spiral wire 17A(U). Each of electric current with the U phase, the V phase and the W phase is shifted in 120° of a phase and each of electric current with the U bar phase, the V bar phase, the W bar phase is shifted in 180° reversely by winding the spiral wires 17B in a reverse direction from the spiral wires 17A. A rotor 25 is mounted inside the stator core 15 with a small clearance and a permanent magnet 26 is fixed on the rotor 25. The permanent magnet 26 has fourteen poles each of which is positioned on a peripheral surface of the rotor 25 with North pole and South pole alternately. The controller 11 generates the control signal to energize the MOSFET of each of driving circuits 12 and 13 in accordance with a rotating position of the rotor 25 detected by a position sensor 27 explained hereinafter. Besides, the controller 11 controls each of the driving circuit 12 and 13 to shift the current phase, of the spiral wires 17A, 17B on the neighboring teeth 16, 16, at an angle corresponding to an angle distance of the neighboring teeth 16 and 16. In details, the angle distance of the neighboring teeth 16 and 16 is thirty degrees (30°=360°/12) so that the controller 11 controls the driving circuits 12, 13 to flow the current by shifting thirty degrees from the U phase of the first system 18A to the U phase of the second system 18B next to them and the V phase, the W phase, the U bar phase, the V bar phase, the W bar phase so on. This thirty degrees is the angle distance of the neighboring teeth 16 and 16.

The electric motor 14 equips the position sensor 27 to detect a rotational position of the rotor 25. The position sensor 27 is, for example, an optical absolute encoder having an unillustrated rotating slit disk and an optical element. The rotating slit disk is rotated with the rotor and the optical element is fixed to the stator core 15 to detect the rotating slit disk. The optical element is positioned at a symmetrical position divided symmetrically the tooth 16 wound the spiral wires 17A of the U phase of the first system 18A and the tooth 16 wound the spiral wires 17B of the U phase of the second system 18B. It is set a reference position of the rotor 25 where a reference set on the rotating slit disk faces to the optical element. Therefore, the position of said reference of the rotating slit disk faced to the optical element is the reference position of the rotor 25 to detect a rotating angle of the rotor 25 from the reference position. A corresponding position of the reference of the rotating slit disk to a center of the spiral wires 17A flown the current of the U phase of the first system 18A is shifted minus fifteen degrees (−15°) in a counterclockwise direction in FIG. 1. On the other hand, a corresponding position of the reference of the rotating slit disk to a center of the spiral wires 17B flown the current of the U phase of the second system 18A is shifted plus fifteen degrees (+15°) in a clockwise direction in FIG. 1. The controller 11 generates the control signal to the first driving circuit 12 on a basis of the position data compensated −15° to the detected position signal of the position sensor 27 and generates the control signal to the second driving circuit 13 on a basis of the position data compensated +15° to the detected position signal of the position sensor 27. Thereby, it is shifted thirty degrees (30°) from the U phase, the V phase, the W phase, the U bar phase, the V bar phase, the W bar phase of the first system 18A to the U phase, the V phase, the W phase, the U bar phase, the V bar phase, the W bar phase of the second system 18B.

The operation of the first embodiment of the present invention constructed above will be explained hereinafter. The controller 11 controls the first driving circuit 12 and the second driving circuit 13 to flow electric current to the plural spiral wires 17A, 17B of the first system 18A and the second system 18B. The current generates a magnetic field around the teeth 16 to make a rotating force of the rotor 25 by a cooperation with the permanent magnet 26 so that the driving circuits 12, 13 cooperates to rotate the rotor 25 in a normal condition. The rotor 25 may be rotated at least one of two energized plural spiral wires 17A, 17B of the first system 18A and the second system 18B in the normal condition. However, when it is happened an abnormal condition in one of systems 18A or 18B, for example the first system 18A has a malfunction not to flow the electric current, the other remaining second system 18B still keeps in flowing the electric current to plural spiral wires 17B to generate the enough rotating force rotating the rotor 25 for a temporal rotation.

The characterized feature of the present invention is that the energized plural spiral wires 17A and 17B of the first system 18A and the second system 18B cooperates usually to rotate the rotor 25, however when it is happened abnormal condition in one of systems 18A or 18B, single of the other remaining energized plural spiral wires 17A or 17B can rotate the rotor 25. The present invention can prevent the rotation of the electric motor 14 from stopping just after the abnormal condition in either of the systems 18A or 18B to achieve a fail-safe function by only one electric motor 14. Therefore, the present invention can decrease a number of parts in comparison with the conventional apparatus having two electric motors so that it restrains an increase of the cost and to achieve a compact structure. More over, since the present invention share one stator 15 by two groups of plural spiral wires 17A, 17B of the first and second systems 18A, 18B, the present invention can reduce a longitudinal length and the total cost in comparison with two stators positioned longitudinally in series of two systems. And also in the present invention, only one position sensor 27 to detect positions of the rotor 25 of the electric motor 14 is prepared for sharing the first system 18A and the second system 18B so that it can reduce a number of parts and restrain the total cost in comparison with each two position sensors for each systems 18A, 18B. More over, in the electric motor apparatus 10, where electric current is flown in the plural spiral wires 17A and 17B of the first system 18A and the second system 18B, the controller 11 shifts the current phase, of the plural spiral wires 17A, 17B on the neighboring teeth 16, 16, at an angle corresponding to an angle distance of the neighboring teeth 16 and 16 so that it can cancel deviations of position phase of the plural spiral wires 17A, 17B. Therefore, it can reduce a torque ripple of the electric motor and it can drive the electric motor 14 smoothly.

Figure 2:
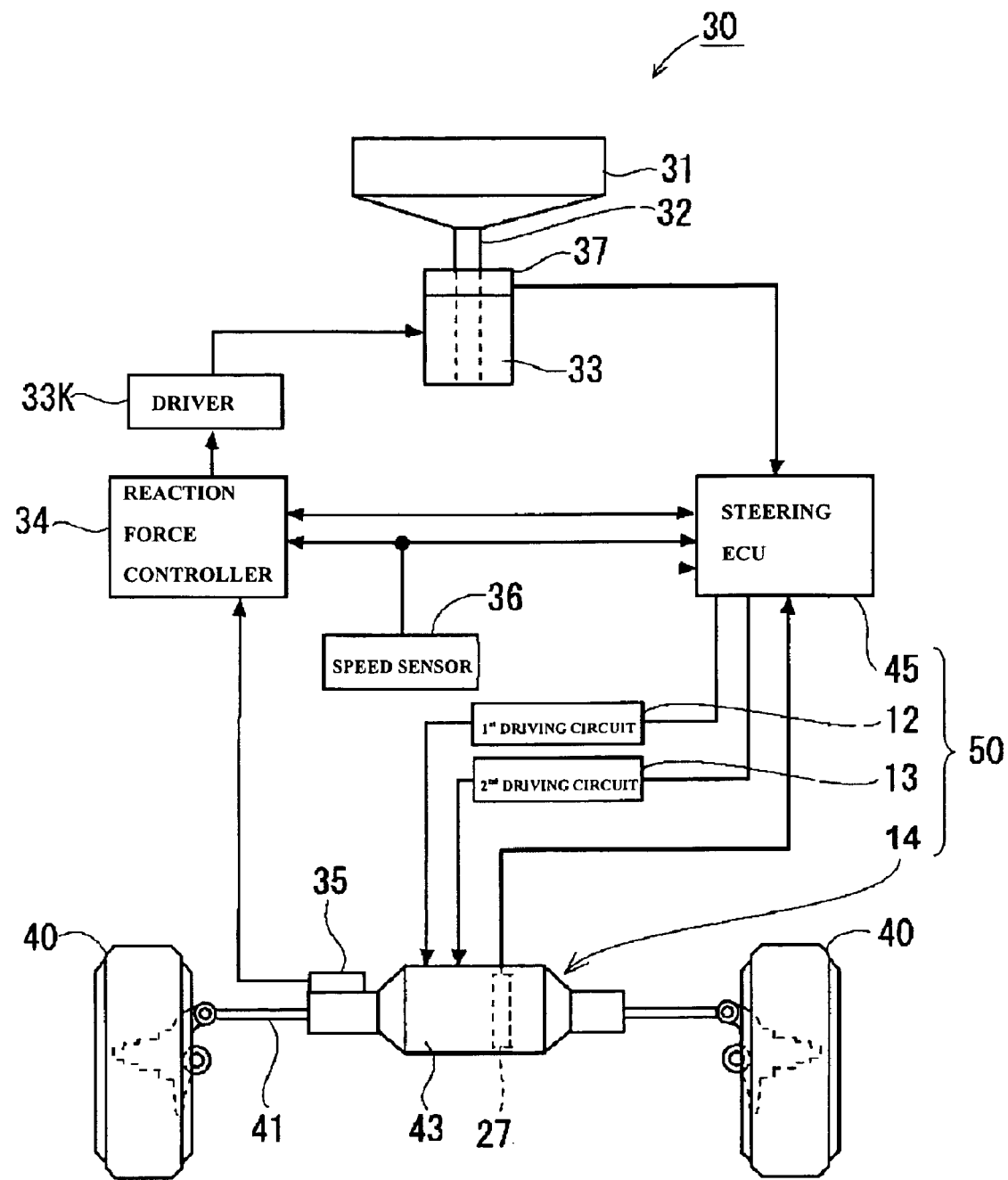
FIG. 2 is a block diagram of a power steering system of a second embodiment of the present invention.

A second embodiment of the present invention applying the first embodiment to a power steering system will be described hereinafter referring to FIG. 2. A power steering system 30 is a so called steer-by-wire system and a steering wheel 31 and steered wheels 40, 40 are mechanically separated with each other. Therefore, an electric motor apparatus 50, disclosed in the first embodiment of the present invention, is provided for steering the steered wheels 40, 40. Hereinafter, only different constructions from the first embodiment are explained and the same constructions to the first embodiment have the same numerals to be omitted the explanation thereof. The steering wheel 31 of the power steering system 30 is fixed to one end of a steering shaft 32 rotatably supported by a reaction force actuator 33 to create a reaction force in accordance with a rotation of the steering wheel 31. Each of detection signals from an axial force sensor 35 and a speed sensor 36 are input into a reaction force controller 34. The axial force sensor 35 detects an axial force acted on a tie rod 41 bridged between the steered wheels 40, 40. The axial force acted on the tie rod 41 is changeable in accordance with a road situation. The reaction force controller 34 outputs a control signal to a driving circuit 33K according to the detected signal by the axial force sensor 35 and the speed sensor 36 so that it can transfer the reaction force to the steering wheel 31 in accordance with the road situation. The reaction force controller 34 outputs also a control signal to the driving circuit 33K according to the detected signal by the speed sensor 36 so that it can control to make a heavy steering to the steering wheel 31 at high speed and a light steering to the steering wheel 31 at a low speed. A steering angle sensor 37 is mounted between the reaction force actuator 33 and the steering shaft 32 to detect a steering angle of the steering wheel 31. A steering controller 45 receives a detected signal from the steering angle sensor 37 to output a control signal to the first and second driving circuits 12, 13 in accordance with a steering angle of the steering wheel 31. Then, the electric motor 14 is driven by the driving circuits 12, 13 to steer the steered wheel 40, 40 according to the steering angle of the steering wheel 31. The stator 15 of the electric motor 14 is fixed in an interior of a hollowed cylindrical housing 43 as shown in FIG. 2. The rotor 25 is operationally connected to the tie rod 41, and a portion of the tie rod 41 covered by the hollowed housing 43 equips an unillustrated ball screw mechanism between the rotor 25 and the tie rod 41 in order to transfer a rotation of the rotor 25 to an axial force. Therefore, the steered wheels 40, 40 are steered by the electric motor 14. The other mechanical and electrical constructions are same to that of the first embodiment and omitted to be explained.

The characterized feature of the power steering system of the second embodiment of the present invention is that a steered angle of the steered wheel 40, 40 mechanically separated from the steering angle of the steering wheel 31 is controlled by the electric motor so that the fail-safe function can be achieved and it can reduce the total cost of the power steering system 30 and also make it compact.

Figure 3:
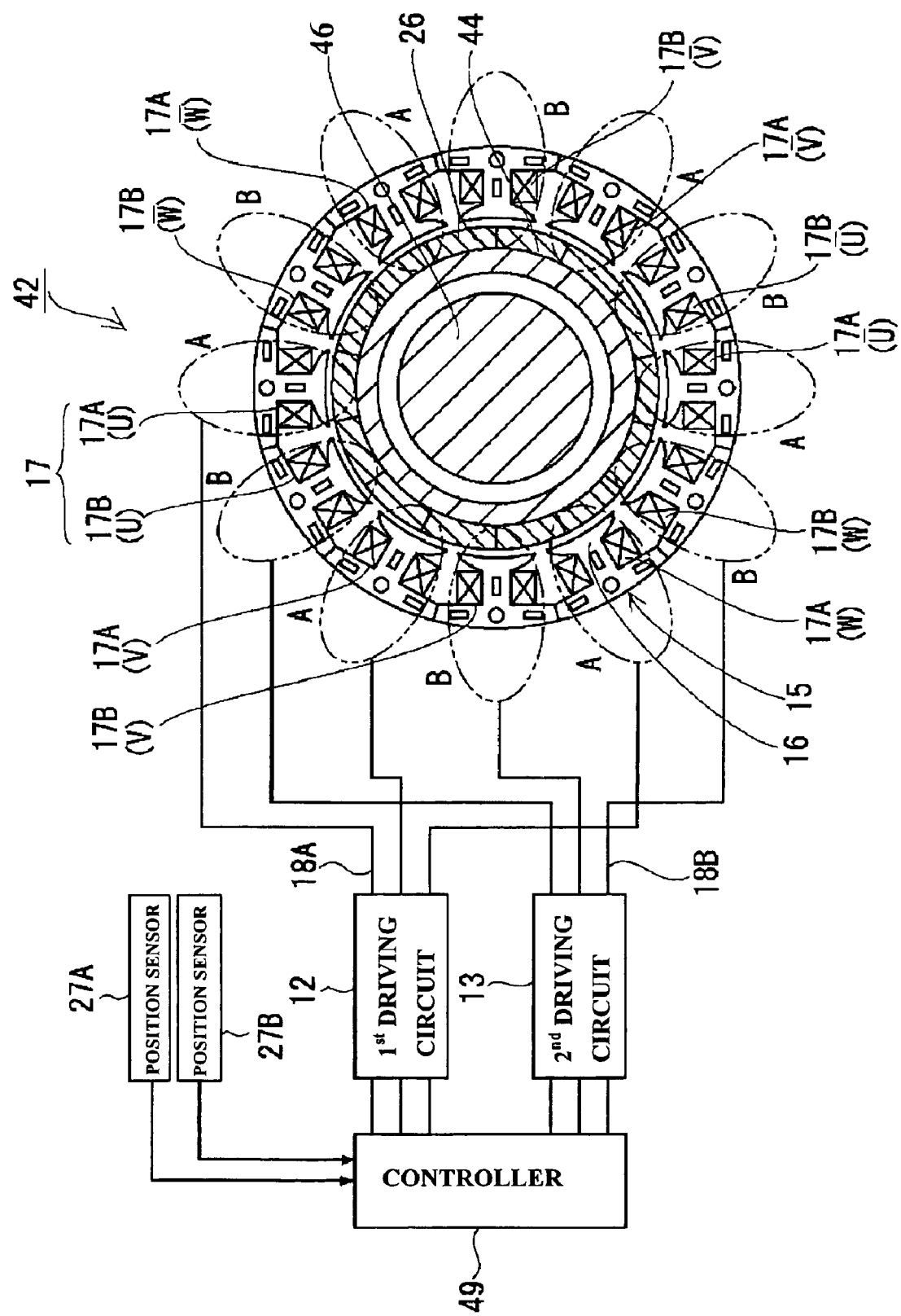
FIG. 3 is a cross-sectional view of the electric motor apparatus of a third embodiment of the present invention.

A third embodiment of the electric motor apparatus of the present invention will be described hereinafter referring to FIG. 3. A main difference of the third embodiment from the first embodiment is to equip one pair of position sensors 27A and 27B. These two position sensors 27A, 27B consist of such as an optical absolute encoder having a rotating slit disk and an optical sensor. One position sensor 27A is for the first system 18A of an electric motor 42 to be positioned in a center of such as the teeth 16 wired the spiral wires 17A of the U phase of the first system 18A, the other position sensor 27B is for the second system 18B to be positioned in a center of such as the teeth 16 wired the spiral wires 17B of the U phase of the second system 18B. A rotor 44 is a hollowed cylindrical shape, through which a tie rod 46, such as said tie rod 41 in the second embodiment of the present invention, is penetrated. A reference position of said one position sensor 17A of the first system 18A is set on the position where the reference position of the rotor 44 is faced to the tooth 16 provided with the optical element thereof, and a reference position of said the other position sensor 17B is set on the position where the reference position of the rotor 44 is faced to the tooth 16 provided with the optical element thereof. Therefore, detected data by these position sensors 27A and 27B has a relationship of a deviation in the angle distance of the neighboring teeth 16 and 16, such as thirty degrees (30°).

A steering controller 49 generates the control signal to control the output from the first driving circuit 12 in accordance with the detected signal from the position sensor 27A for the first system 18A to energize the first system 18A, and generates the control signal to control the output from the second driving circuit 13 in accordance with the detected signal from the position sensor 27B for the second system 18B to energize the first system 18B. Thereby, in normal condition, the plural spiral wires 17A and 17B of both systems 18A and 18B cooperate to energize to rotate the rotor 25. At this time, the controller 49 controls each of the driving circuits 12 and 13 to shift the current phase, of the spiral wires 17A, 17B on the neighboring teeth 16, 16, at an angle corresponding to an angle distance of the neighboring teeth 16 and 16 so that the deviation of the positioning phase of both of the plural spiral wires 17A, 17B is canceled each other to restrain a torque ripple of the electric motor 42 and to drive it smoothly. However, at an abnormal condition, for example in the position sensor 27A of the first system 18A, the controller 49 controls the output from the first and second driving circuits 12, 13 on the basis of only the position sensor 27B for the second system 18B to energize both of the systems 18A and 18B. At this time, the controller 49 controls the second driving circuit 13 on the basis of the second position sensor 27B as usual, on the other hand, it controls the first driving circuit 12 on the basis of a compensated value of the opening angle (for example 30° (thirty degrees)) adding to the control signal from the position sensor 18B for the second system 18B. Thereby, the deviation of the positioning phase of both of the plural spiral wires 17A, 17B is canceled each other to restrain a torque ripple and to drive the electric motor smoothly. Besides, it operates in the same way at the abnormal condition of second position sensor 17B for the second system 18B.

Figure 4:
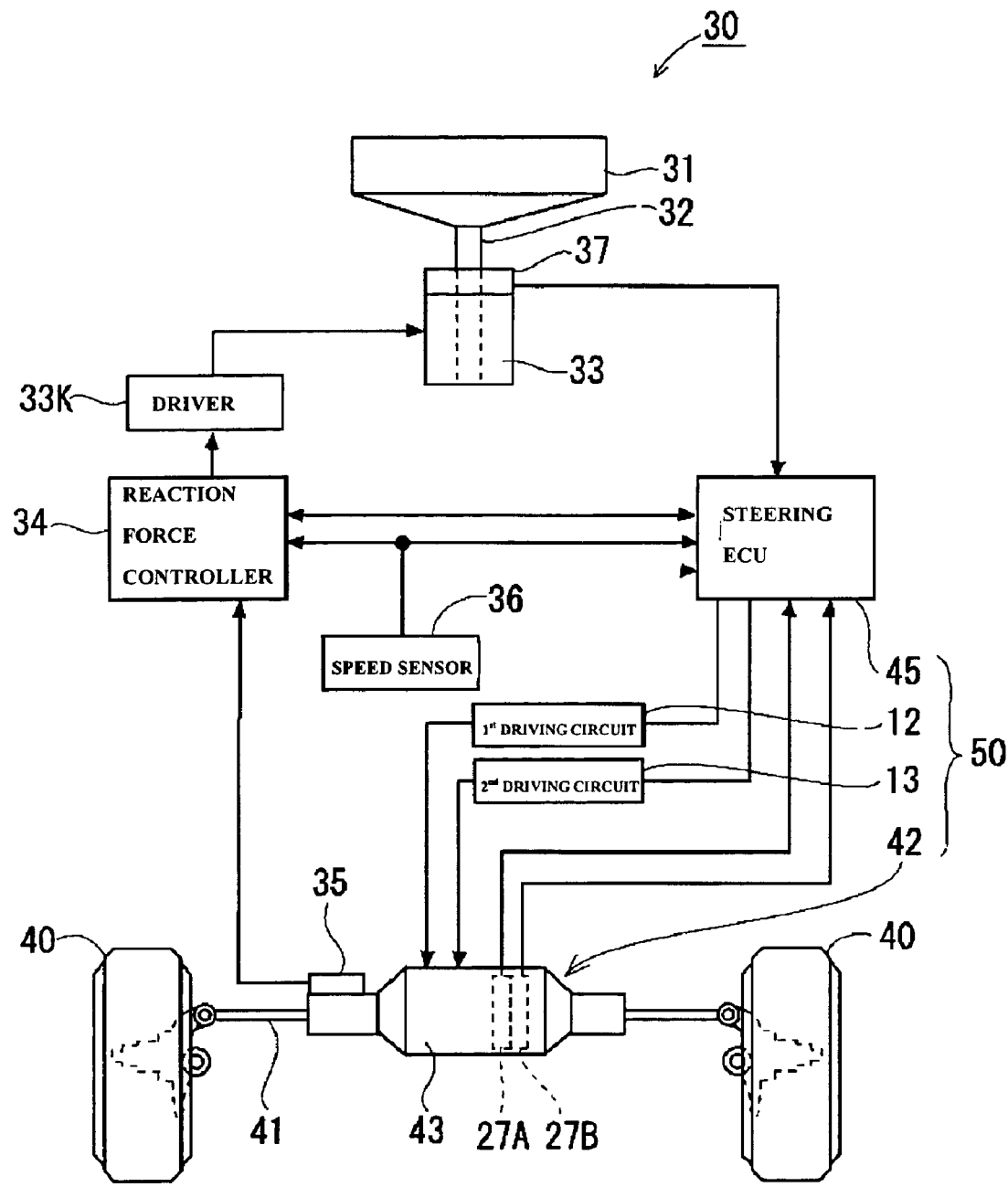
FIG. 4 is a block diagram of a power steering system of a fourth embodiment of the present invention.

The fourth embodiment of the present invention, referring to FIG. 4, is to apply the electric motor apparatus of the third embodiment of the present invention to the power steering system of the second embodiment of the present invention, that is to say said two position sensors 27A and 27B in the third embodiment are replaced to said one position sensor 27 in the first embodiment which is applied to make the second embodiment. Therefore, detail explanation of the construction and operation of the fourth embodiment is omitted.

While the invention has been described in detail with reference to the preferred embodiment, it will be apparent to those skilled in the art that the invention is not limited to the present embodiment, and that the invention may be realized in various other embodiments within the scope of the claims. The example is shown herein under:

(1) The first embodiment of the present invention is to mount the plural spiral wires 17A and 17B alternatively one by the other, the position of the spiral wires 17A and 17B is not limited to the relationship as shown in the first embodiment. For example, it can be performed for the present invention that two spiral wires 17A and two spiral wires 17B are mounted alternatively one by the other. And it can be also performed for the present invention that the spiral wires 17A is wired by half amount of the spiral wires 17B and two of this half wired spiral wires 17A and one spiral wires 17B are mounted alternatively one by the other.

(2) The third embodiment of the present invention is performed in the way that when one of position sensors 27A and 27B is in the abnormal condition, the other position sensors 27A and 27B energizes both of the systems 18A and 18B on the basis of the other position sensor. It can be however performed the present invention that said one system is perfectly stopped and only the other system is performed based on the detected signal by the other position sensor.

(3) The second and fourth embodiments of the present invention are equipped on the power steering system, it can be applied the electric motor apparatus of the present invention to other fail-safe function than the power steering system.

(4) The first and third embodiments of the present invention the position of the rotor is detected by the optical position sensors 27, 27A, 27B, the position sensor is not limited to the optical sensor but it may be magnetic or leaser-type.

Furthermore, the technological components described in this specification and illustrated in the drawings can demonstrate their technological usefulness independently through various other combinations which are not limited to the combinations described in the claims made at the time of application. Moreover, the art described in this specification and illustrated in the drawings can simultaneously achieve a plurality of objectives, and is technologically useful by virtue of realizing any one of these objectives.

What is claimed is:

1. An electric motor apparatus comprising:
   an electric motor having a rotor and a stator;
   a driving circuit;
   a controller controlling said driving circuit including first driving circuit and second driving circuit; and
   spiral wires mounted on said stator of said electric motor to be scattered peripherally and energized to rotate said rotor of said electric motor, said spiral wires being classified into two groups of first system and second system.

2. An electric motor apparatus according to claim 1, wherein
   said energized spiral wires rotate said rotor by at least one of said two groups of said spiral wires for said first system and said second system in normal condition; and
   said controller controls said driving circuits to rotate said rotor by only one of two groups of said spiral wires where the other remaining group of said spiral wires is in abnormal condition.

3. An electric motor apparatus according to claim 2, wherein
   said energized spiral wires rotate said rotor by a cooperation of said two groups of said spiral wires for said first system and said second system in normal condition.

4. An electric motor apparatus according to claim 3, wherein
   said electric motor is an alternating current motor changing a phase of a current supplied to said spiral wires of said first system and said second system according to a position of said rotor; and
   said electric motor apparatus provides one position sensor detecting said position of said rotor and being shared by said first system and said second system.

5. An electric motor apparatus according to any one of claims 1 to 4, wherein
   each of said spiral wires for said first system and said second system is disposed one by the other alternatively; and
   said controller controls each of said first driving circuit and said second driving circuit to shift the current phase of spiral wires on neighboring teeth in said first system and said second system at an angle corresponding to an angle distance of said neighboring teeth.

6. A power steering system including said electric motor apparatus according to claim 5, comprising:
   a steering wheel for a vehicle; and
   a steered wheel separated mechanically from said steering wheel, wherein said electric motor apparatus controls to position a steered angle of said steered wheel on a basis of a steering angle of said steering wheel.

7. An electric motor apparatus comprising:
   an electric motor having a rotor and a stator;
   a driving circuit;
   a controller controlling said driving circuit including first driving circuit and second driving circuit;
   spiral wires mounted on said stator of said electric motor to be scattered peripherally and energized to rotate said rotor of said electric motor, said spiral wires being classified into two groups of first system and second system;
   said electric motor is an alternating current motor changing a phase of a current supplied to said spiral wires for said first system and said second system according to a position of said rotor;

one position sensor for said first system; and the other position sensor for said second system, wherein said energized spiral wires rotate said rotor by a cooperation of said spiral wires for said first system and said second system on a basis of each of said position sensors respectively in normal condition; and said controller controls said driving circuits to rotate said rotor by one of or both of said first system and said second system on a basis of the other remaining position sensor where one of said position sensors is in abnormal condition.

8. A power steering system including said electric motor apparatus according to claim 7, comprising:

a steering wheel for a vehicle; and a steered wheel separated mechanically from said steering wheel, wherein said electric motor apparatus controls to position a steered angle of said steered wheel on a basis of a steering angle of said steering wheel.

9. An electric motor apparatus comprising:

an electric motor having a rotatably mounted rotor and a stator, wherein said stator includes a first winding system and a second winding system;

a first driving circuit electrically connected to said first winding system;

a second driving circuit electrically connected to said second winding system; and a controller controlling said first and second driving circuits to energize said first and second winding systems, wherein said first and second winding systems are arranged such that said rotor can be rotated by the energization of either one of said first and second winding systems or by the energization of both of said first and second winding systems.

10. An electric motor apparatus comprising:

an electric motor having a rotatably mounted rotor and a stator, wherein said stator includes a first winding system and a second winding system;

means including first and second driving circuits for rotating said rotor by the energization of either one of said first and second winding systems or by the energization of both of said first and second winding systems.

11. A power steering system comprising:

an electric motor apparatus comprising an electric motor having a rotatably mounted rotor and a stator, wherein said stator includes a first winding system and a second winding system; a first driving circuit electrically connected to said first winding system; a second driving circuit electrically connected to said second winding system; and a controller controlling said first and second driving circuits to energize said first and second winding systems, wherein said first and second winding systems are arranged such that said rotor can be rotated by the energization of either one of said first and second winding systems or by the energization of both of said first and second winding systems;

a steering wheel for a vehicle; and a steered wheel separated mechanically from said steering wheel, wherein said electric motor apparatus controls to position a steered angle of said steered wheel on a basis of a steering angle of said steering wheel.

12. A power steering system comprising:

an electric motor apparatus comprising an electric motor having a rotatably mounted rotor and a stator, wherein said stator includes a first winding system and a second winding system; means including first and second driving circuits for rotating said rotor by the energization of either one of said first and second winding systems or by the energization of both of said first and second winding systems;

a steering wheel for a vehicle; and a steered wheel separated mechanically from said steering wheel, wherein said electric motor apparatus controls to position a steered angle of said steered wheel on a basis of a steering angle of said steering wheel.

* * * * *